(12) United States Patent
Strong et al.

(10) Patent No.: US 8,633,391 B2
(45) Date of Patent: Jan. 21, 2014

(54) PROTECTIVE DEVICE

(75) Inventors: James Alan Strong, Olean, NY (US); David R. Miller, Allegany, NY (US)

(73) Assignee: Cooper Technologies Company, Houston, TX (US)

( * ) Notice: Subject to any disclaimer, the term of this patent is extended or adjusted under 35 U.S.C. 154(b) by 117 days.

(21) Appl. No.: 13/160,124

(22) Filed: Jun. 14, 2011

(65) Prior Publication Data

US 2012/0320552 A1 Dec. 20, 2012

(51) Int. Cl.
*H01R 4/70* (2006.01)

(52) U.S. Cl.
USPC .................. 174/138 F; 174/137 R; 174/142; 174/138 G; 361/117

(58) Field of Classification Search
USPC .............. 174/138 F, 137 R, 135, 142, 138 G; 361/117, 118
See application file for complete search history.

(56) References Cited

U.S. PATENT DOCUMENTS

| | | | |
|---|---|---|---|
| 2,012,689 A | 8/1935 | McFarlin | |
| 3,192,312 A | 6/1965 | Sauer | |
| 3,639,678 A | 2/1972 | Muschong | |
| 3,639,681 A | 2/1972 | Ettlinger | |
| 4,845,307 A | 7/1989 | Cumming et al. | |
| 4,883,399 A | 11/1989 | MacLean | |
| 5,568,132 A | 10/1996 | Pratt | |
| 5,864,096 A | 1/1999 | Williams et al. | |
| 6,034,330 A | 3/2000 | Pratt | |
| 6,053,683 A | 4/2000 | Cabiran | |
| 6,291,774 B1 | 9/2001 | Williams | |
| 6,877,997 B2 | 4/2005 | Schäty | |
| 6,878,883 B1 | 4/2005 | Rauckman | |
| 6,963,025 B1 | 11/2005 | Kysely | |
| 6,995,313 B1 * | 2/2006 | Barnett et al. | 174/5 R |
| 7,009,102 B2 | 3/2006 | Milner | |
| 7,075,015 B1 | 7/2006 | Rauckman | |
| 7,154,034 B2 | 12/2006 | Lynch | |
| 7,154,036 B2 | 12/2006 | Lynch | |
| 7,301,096 B2 | 11/2007 | Strong et al. | |
| 2006/0164781 A1 | 7/2006 | Strong et al. | |

FOREIGN PATENT DOCUMENTS

EP 1052657 A2 11/2000

OTHER PUBLICATIONS

International Search Report and Written Opinion for International Application No. PCT/US2012/036094, mailed Jul. 10, 2012.
Central Moloney, Inc., Components Operation, A.B. Cap Arrester Bracket Wildlife Guard, Product Data Sheet, File No. PDS1034, issued Aug. 15, 2003, pp. 1-2.

(Continued)

*Primary Examiner* — Dhirubhai R Patel
(74) *Attorney, Agent, or Firm* — Fish & Richardson P.C.

(57) ABSTRACT

A device includes a cover that includes a base. The cover is configured to be positioned over a mount that couples a support structure of an electrical device to another element. The electrical device includes an energized terminal that is configured to connect to an electrical power system and a grounded terminal. The device also includes an insulating interface coupled to the base of the cover such that, when the cover is positioned over the mount, the interface contacts the support structure to substantially electrically insulate the mount. A system includes an electrical device, a support structure that holds the electrical device on the first side, a mount configured to couple the structure to another element, the mount being grounded during operation of the system, and a protective device positioned over the mount.

22 Claims, 15 Drawing Sheets

(56) References Cited

OTHER PUBLICATIONS

Central Moloney, Inc., Components Operation, A.B. Cap Arrester Bracket Wildlife Guard, Product Data Sheet, File No. PDS1034, issued Apr. 15, 2006, pp. 1-2.

Cooper Power Systems, Surge Arresters, UltraSIL Housed VariSTAR Surge Arresters: Normal Duty (5kA), Heavy Duty (10kA), and Heavy Duty Riser Pole (10kA), Electrical Apparatus No. 235-35, Jan. 2000, 12 pages.

Eco Electrical Systems, Inc. Catalog, Manufactures of Wildlife Protective Products, Created Sep. 4, 2004, 8 pages.

Cooper Power Systems, "The CooperGuard shield from Cooper Power Systems offers optimum protection both for arresters and wildlife", File No. B235-08022, Nov. 2008, 2 pages.

\* cited by examiner

PROTECTIVE DEVICE

TECHNICAL FIELD

This description relates to a protective device that insulates mounting hardware of an electrical device.

BACKGROUND

Electrical devices used in power systems include, for example, surge arresters, terminations, and bushings. Such electrical devices typically have a high voltage or energized terminal. For example, a surge arrester may include a high voltage or energized terminal and a ground terminal. If an object comes in direct contact with or is in close proximity to the energized terminal of the surge arrester and the object simultaneously is in direct contact with or is in close proximity to a grounded area, the object may become a conducting path for current of the power system. Current flow through or over the object results in a power system outage, and, if the object is an animal, may be a fatal event.

SUMMARY

As discussed below, a protective device may be placed over (perhaps directly attached) to a grounded area in an electrical power system to prevent or substantially reduce the possibility of current flowing through an object that is simultaneously in the vicinity of the grounded area of the power system and an energized area of the power system.

In one general aspect, a device includes a cover that includes a base. The cover is configured to be positioned over a mount that couples a support structure of an electrical device to another element. The electrical device includes an energized terminal that is configured to connect to an electrical power system and a grounded terminal. The device also includes an insulating interface coupled to the base of the cover such that, when the cover is positioned over the mount, the interface contacts the support structure to substantially electrically insulate the mount.

Implementations may include one or more of the following features. The electrical device may include a surge arrester, and the support structure may be an insulating hanger of the surge arrester. The insulating hanger may be mounted to a transformer mounting bracket at the mount. The cover may include an insulated material configured to withstand a power frequency voltage up to 22 kilovolts (kV) for at least sixty seconds.

The interface may be integral with the base such that the device is a single piece. The interface may be a gasket. The interface may be positioned in a channel formed along an outer circumference of the base of the cover. An exterior surface of the cover may include smooth surfaces and edges. An exterior surface of the cover may include at least one fin that protrudes in a radial direction from the exterior surface of the cover. The exterior surface of the cover and the at least one fin may include rounded surfaces and edges.

The cover may include an internal cavity, and the internal cavity may be configured to receive the mount. The internal cavity may include threads on a surface of the cavity, the mount may include threads on an exterior surface, and the threads of the internal cavity may be configured to mate with the external threads of the mount to attach the cover to the mount. The cover may include an internal cavity, and the internal cavity may be configured to receive the mount and to attach the cover to the mount with an interference fit. The cover may include an internal cavity, and the internal cavity may be configured to directly receive the mount such that, when the cover is positioned over the mount and the interface contacts the support structure, the cavity is substantially air-free.

In some implementations, the device may be configured to be positioned over the mount without the use of tools.

In another general aspect, a system includes an electrical device including a grounded terminal on a first side and an energized terminal on a second side, the energized terminal being configured to connect with an electrical distribution system, a support structure that holds the electrical device on the first side, a mount configured to couple the structure to another element, the mount being grounded during operation of the system, and a protective device positioned over the mount. The protective device includes a cover that includes a base and an insulating interface coupled to the base such that, when the cover is positioned over the mount, the interface contacts the support structure to substantially electrically insulate the mount.

Implementations may include one or more of the following features. The electrical device may include a surge arrester. The system also may include an insulator on the energized terminal of the electrical device. The interface may be a gasket made of an electrically insulating material. The interface and the protective device may be integral such that the protective device and the interface are a single element. The protective device may be removable from the mount.

In another general aspect, a method of insulating a mounting point of a support structure includes positioning an interface at a base of a protective device, and placing the base of the protective device over a grounded mounting point that couples a support structure of an electrical device to a mounting bracket, such that, when the grounded mounting point is received in the recess, the interface contacts the support structure to substantially insulate the grounded mounting point and the recess is substantially air-free when the grounded mounting point is received in the recess.

Implementations may include one or more of the following features. The interface may include a gasket, and receiving the grounded mounting point in the recess may capture the gasket between the base of the protective device and the structure. Receiving the grounded mounting point in the recess may include threading the protective device onto threads on an external surface of the mounting point.

Implementations of any of the techniques described above may include a process of using a protective device, a process of making a protective device, a system that includes a protective device, a device, an apparatus, and/or a protective device. The details of one or more implementations are set forth in the accompanying drawings and the description below. Other features will be apparent from the description, the drawings, and the claims.

DESCRIPTION OF DRAWINGS

Like reference symbols in the various drawings may indicate like elements.

DETAILED DESCRIPTION

Figure 1:
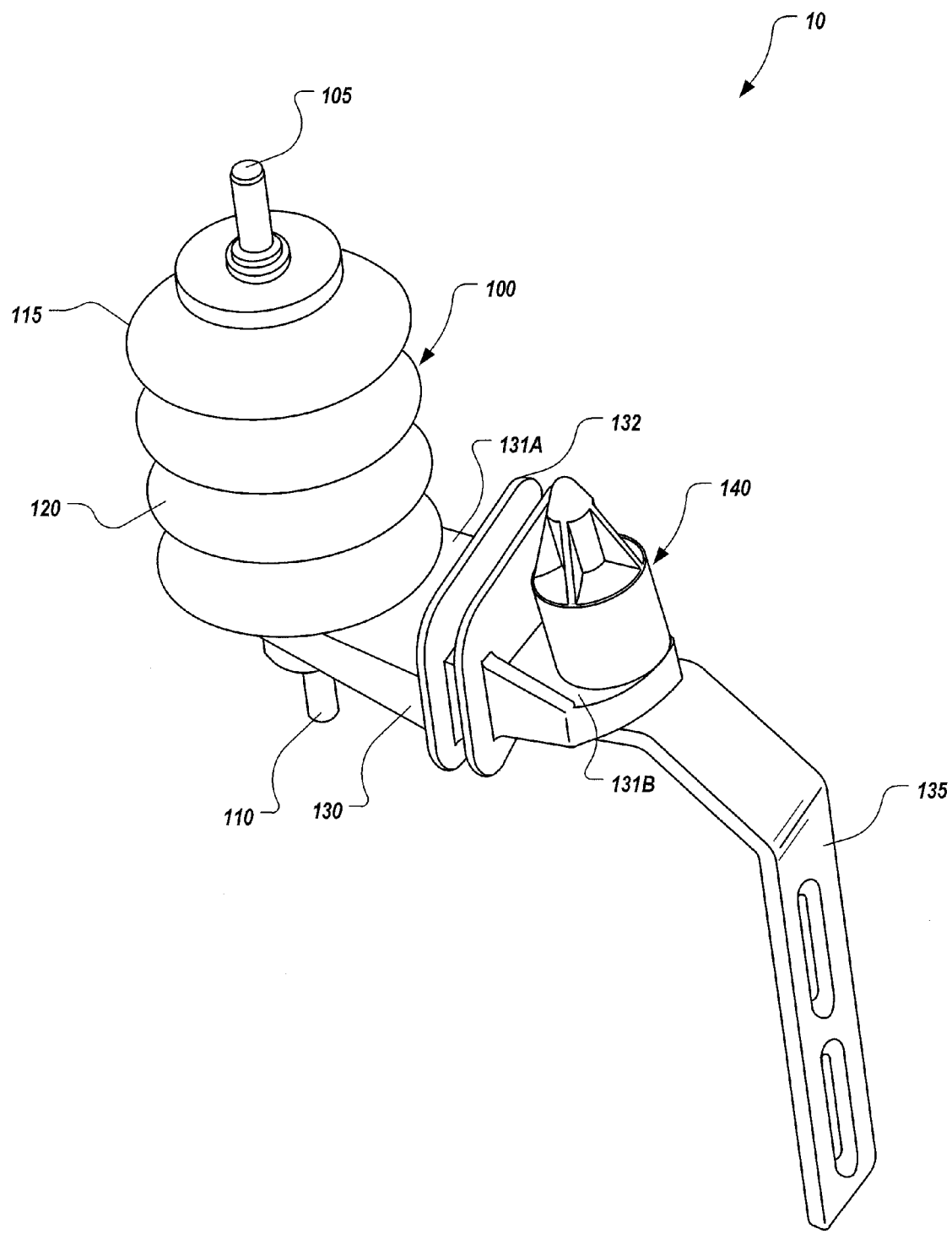
FIG. 1 shows an example system for protecting electrical equipment.

The present disclosure describes a protective device for use in an electrical system that includes an electrical device, such as a surge arrester, having a grounded terminal and an energized terminal. The electrical system includes a connection point where the electrical device is coupled to or mounted to a support structure (such as a mounting hanger). The connection point may be a bolt or another piece of mounting hardware, the connection point may include grounded mounting hardware attached to the insulating hanger of the surge arrester, and the connection point may be grounded during operation of the electrical system. The protective device is positioned over the mounting point to electrically isolate and/or insulate the mounting point from the energized terminal of the electrical device and/or other energized or high-voltage points in or near the electrical system. Electrical insulation of the connection point may be provided by applying an insulating material directly to the connection point that couples the surge arrester, or a part of the surge arrester, to the hanger.

As discussed in greater detail below, the protection device and the electrical insulation provided by the protection device may prevent, inhibit, or reduce the incidence of external influences, such as animals, tree limbs, debris or other objects, from coming in direct contact with or coming close to the mounting point and nearby energized connections (such as an energized terminal of the surge arrester). When objects come in direct contact with or are in close proximity to the energized areas of the surge arrester while also being in direct contact or close to nearby grounded areas (such as the connection point) of the power system apparatus, the object may become a conducting path for power frequency current. This event of power frequency current flow through or over the object involved often results in a power system outage. If the object is an animal, this may be a fatal event for the animal. The systems, techniques, and components described below may provide protection for wildlife, reduce the possibility of collateral damage to other power system apparatus, and increase power system reliability by reducing power system outages caused by interference between energized power system components and the connection point.

The protective device may be installed (for example, by threads, interference fit, frictional engagement, or otherwise attached) on the hardware used to mount surge arresters on medium and high voltage equipment (such as a transformer). In some examples, the protective device provides an "electric seal" in the form of an interface (for example, a gasket or a preformed O-ring) molded directly into the radius of the base of the protective device or otherwise inserted in the radius of the base of the protective device. The insulating properties of the material of the protective device in conjunction with the gasket may provide electrical insulation between the high voltage terminal of the arrester and the surge arrester mounting connection (which may be grounded during operation of the system).

Figure 2:
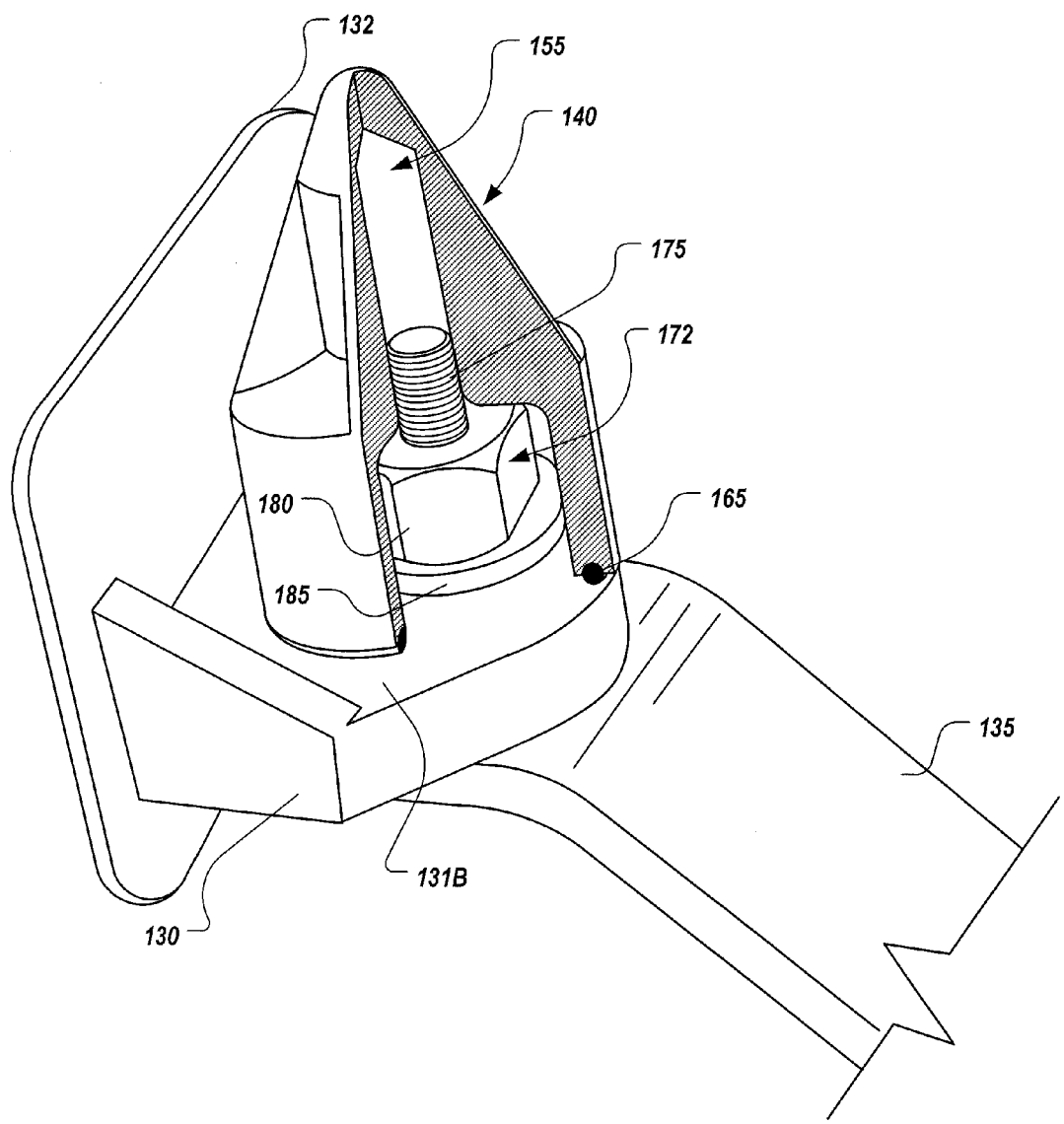
FIG. 2 shows a partial cross-section of a protective device as installed in the system of FIG. 1.

FIG. 1 shows an example system 10 for protecting electrical equipment. The system 10 includes a surge arrester 100, a support structure 130, a mounting bracket 135, and a protective device 140. Referring also to FIG. 2, a partial cross-section of the protective device 140 as installed in system 10 is shown. The protective device 140 includes an insulating interface 165. When the protective device 140 is positioned over a mount 172 that couples the support structure 130 to the mounting bracket 135, the interface 165 contacts the support structure 130 and electrically insulates the mount 172. The mount 172 may be part of the grounded mounting hardware of the surge arrester 100, and the mount 172 may be grounded during operation of the system 10. The interface 165 may be referred to as an "electric seal" or an interface that forms an "electric seal" at the mount 172. The "electric seal" is a water-tight, or substantially water-tight, seal, the presence of which may prevent flashover and reduce the strike distance.

The surge arrester 100 is coupled to the support structure 130 and the support structure 130 bears at least a portion of the weight of the surge arrester 100. The support structure 130 may be an insulating hanger of the surge arrester 100. The support structure 130 includes a first flange area 131A that supports the arrester 100, a second flange area 131B that mounts to the mounting bracket 135 with the mount 172, and ribs 132. The mounting bracket 135 may couple the system 10 to an external structure or component, such as a transformer (not shown).

The surge arrester 100 (described in greater detail in FIG. 10) includes a high voltage (or energized) terminal 105, a ground terminal 110, and an insulating housing 115 that includes weather sheds 120. Positioning the protective device 140 over the mount 172 may prevent or substantially reduce external influences and/or objects (such as animals, tree limbs, or system debris) from simultaneously contacting, or coming into close proximity to, the energized portions of the system 10 (such as the terminal 105) and a grounded portion of the system 10 (such as the mount 172). When an object is in contact with, or close proximity to, an energized portion and a grounded portion, the object may become a conducting path for power frequency current. The occurrence of such a conducting path may result in a power outage, and, when the object is an animal, the occurrence of the conducting path may also be fatal to the animal.

However, positioning the protective device 140 on the mount 172 (as shown in FIGS. 1 and 2) may allow an external, electrically conducting object to come into close proximity to the protective device 140 and the energized terminal 105, make contact and/or land on the protective device 140 while the system 10 is in use without drawing an arc or causing a flashover.

Accordingly, insulating the mount 172 may increase the reliability and safety of the system 10. Further, the protective device 140 may be mounted directly on the mount 172. The presence of the interface 165 may provide greater dielectric strength than a device that uses an air-filled distance without a gasket or interface to cover a grounded point, portion, mount, or location. As a result, the protective device 140 has a relatively compact design.

For example, a system that relies on an air-filled space to cover the mount 172 may provide a covered air-filled space of approximately two inches (approximately 5 cm) on all sides of the grounded mount 172. In contrast, the presence of the interface 165 results in the diameter of the protective device 140 being determined essentially by the diameter of the grounded mount 172 and the wall thickness of the material used to make the protective device 140. In some implementations, the wall thickness of the protective device 140 may be approximately 200 thousandths of an inch. As such, the diameter at the base of the protective device 140 may be approximately 400 thousandths of an inch plus the diameter of a recess 155, which is sized to fit the grounded mount 172. Thus, the protective device 140 may isolate the grounded mount 172 with substantially less material and bulk than a system that relies on a covered air-filled space to insulate the grounded mount 172.

Referring to FIG. 2, the protective device 140 is positioned over the mount 172. In this example, the mount 172 includes a threaded bolt 175, a nut 180, and a washer 185. The mount 172, however, may include any suitable combination of mechanical fastening elements. The protective device 140 includes an internal cavity (or recess) 155 that receives the mount 172 such that, when the protective device 140 is positioned over the mount 172, the interface 165 contacts a surface of the second flange area 131B to electrically insulate the mount 172.

Thus, the protective device 140 provides electrical insulation between the high voltage terminal 105 of the surge arrester 100 and the mount 172. The protective device 140 also isolates and provides electrical insulation between the mount 172 and other high-voltage or energized conductors that may be in the system 10 or in proximity to the system 10. The protective device 140 may inhibit, reduce, or prevent external flashovers of the surge arrester insulating housing 115 from the high voltage terminal 105 of the arrester 100 to the mounting bracket 135 resulting from incidental or direct contact from wildlife or tree branches.

Figure 3:
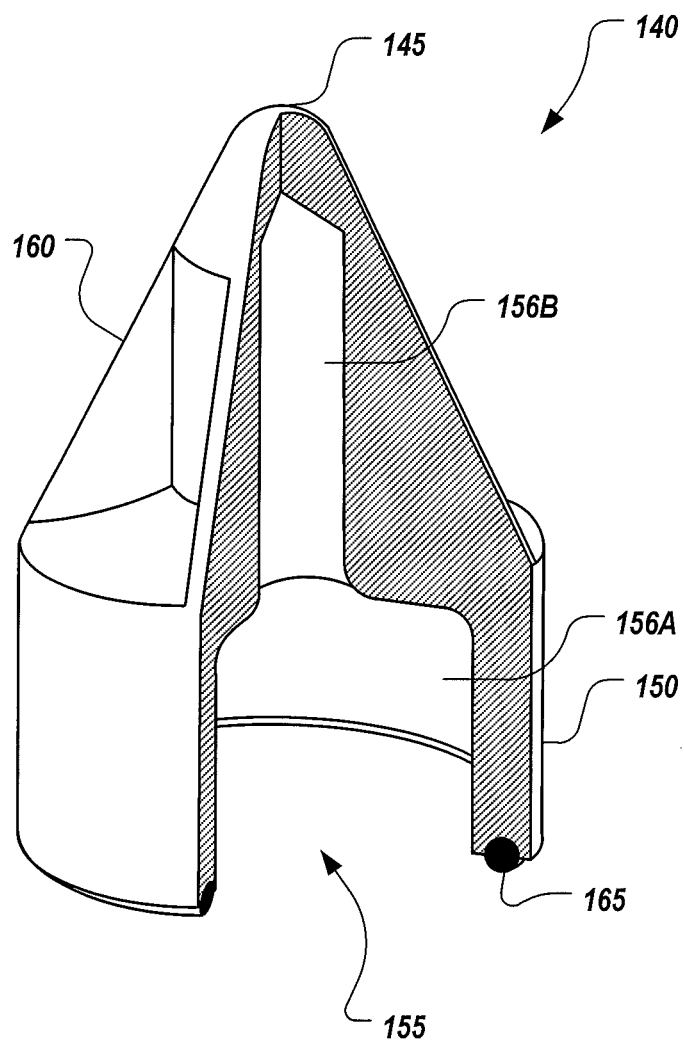
FIG. 3 shows an isolated partial cross-section of the protective device of FIG. 2.

Referring to FIG. 3, an isolated partial cross-section of the protective device 140 is shown. The protective device 140 includes a top portion 145 and a base portion 150. In the example shown, the top portion 145 is conical and the base portion 150 is cylindrical. The inner surface of the protective device 140 defines the internal cavity 155. The internal cavity 155 includes a base section 156A and a top section 156B. The top portion 145 includes a fin 160 that protrudes radially from a surface of the top portion 145.

In the example shown in FIG. 3, the internal cavity 155 is shaped and sized to receive the components of the mount 172. The base section 156A of the internal cavity 155 is configured to receive the combination of the bolt 175, the nut 180, and the washer 185, and the top section 156B of the internal cavity 155 is configured to receive the shaft of the bolt 175. The protective device 140 may be fixedly coupled to the mount 172 by, for example, threading the protective device 140 directly to the mount 172. Other mounting techniques may be used. For example, in the implementation shown in FIG. 3, the internal cavity 155 is configured to provide an interference fit with the mount 172. The protective device 140 may be secured to the mount 172 with bond and/or adhesive. The internal cavity 155 may be sized and shaped to receive the mounting hardware of any surge arrester or electrical device mountable to the support structure 130.

The protective device 140 includes the interface 165. When the protective device 140 is positioned over the mount 172, the interface 165 contacts the support structure 130 (such as shown in FIG. 2) to substantially electrically insulate the mount 172. When seated on the second flange portion 131B, the protective device 140 may have a diameter of about 4.44 cm (about 1¾ inches) or less. The shape, materials, and cross-section of the protective device 140 have sufficient thickness to withstand power frequency voltage of up to 22 kV rms for 60 seconds while dry. In some examples, the protective device 140 has a wall thickness of approximately 200 thousandths of an inch. The shape, materials, and cross-section of the protective device 140 allow the protective device 140 to withstand up to about 34 kiloVolts (kV) of line-to-line voltage, and the protective device 140 may be used in a system that includes a distribution-class surge arrester.

Figure 4:
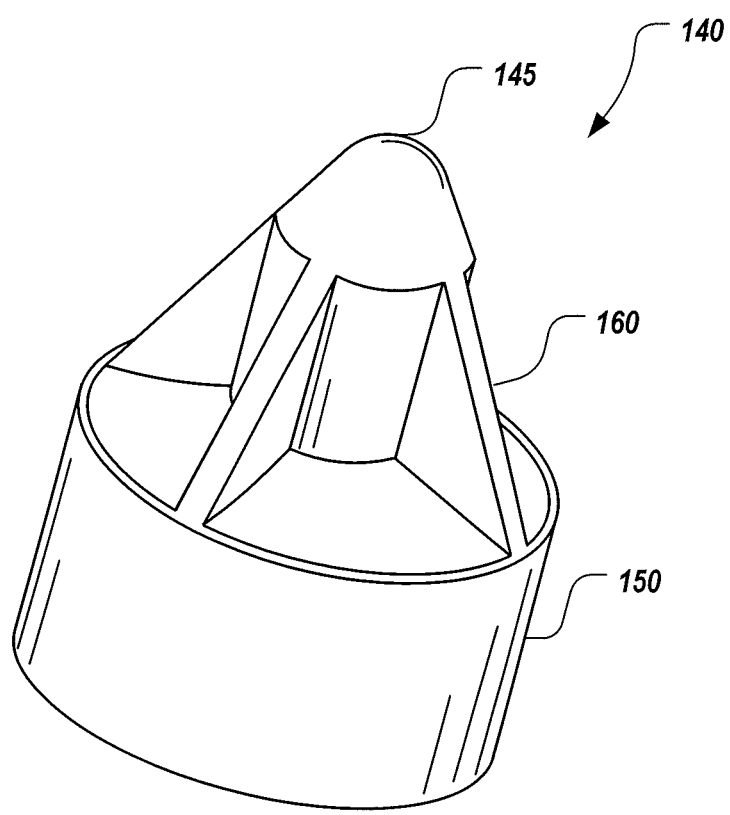
FIG. 4 shows an isolated perspective view of the protective device of FIG. 2.

FIG. 4 shows an isolated perspective view of the protective device 140. As shown, the protective device 140 includes a number of fins 160 protruding radially from a surface of the top portion 145. For example, the protective device 140 may include two, three, or four fins, or any other appropriate number of fins. The fins 160 may be positioned equidistant from each other, randomly, or in any other appropriate arrangement. In the example shown in FIG. 4, the fins 160 are suitably spaced and sized to be grasped by a human hand for installation or removal of the protective device 140. The protective device 140 may include a number of fins that are arranged such that the protective device 140 may be grasped by a gloved human hand. Thus, the fins 160 allow the protective device 140 to be installed by a human operator without the use of tools. Providing the protective device 140 with fins 160 may also reduce the amount of material used in manufacturing the device, and thus may reduce manufacturing costs. Further, the sloped surfaces of the conical top portion 145 may encourage the shedding of water or other debris and/or inhibit perching or squatting on the protective device 140 by small animals.

The top portion 145 and the base 150 portion of the protective device 140 may be made of any appropriate electrically insulating material. For example, the top portion 145 and the base 150 of the protective device 140 may be made of polyethylene, silicone, vulcanized silicon, EPDM, or any other material with suitable dielectric strength, electrical resistivity, and electrical insulating properties. The top portion 145 and the base portion 150 may be made from a material having suitable ultraviolet light (UV) resistant properties, such as opacity to protect the protective device from degradation from extended outdoor use and exposure to UV radiation.

Figure 5A:
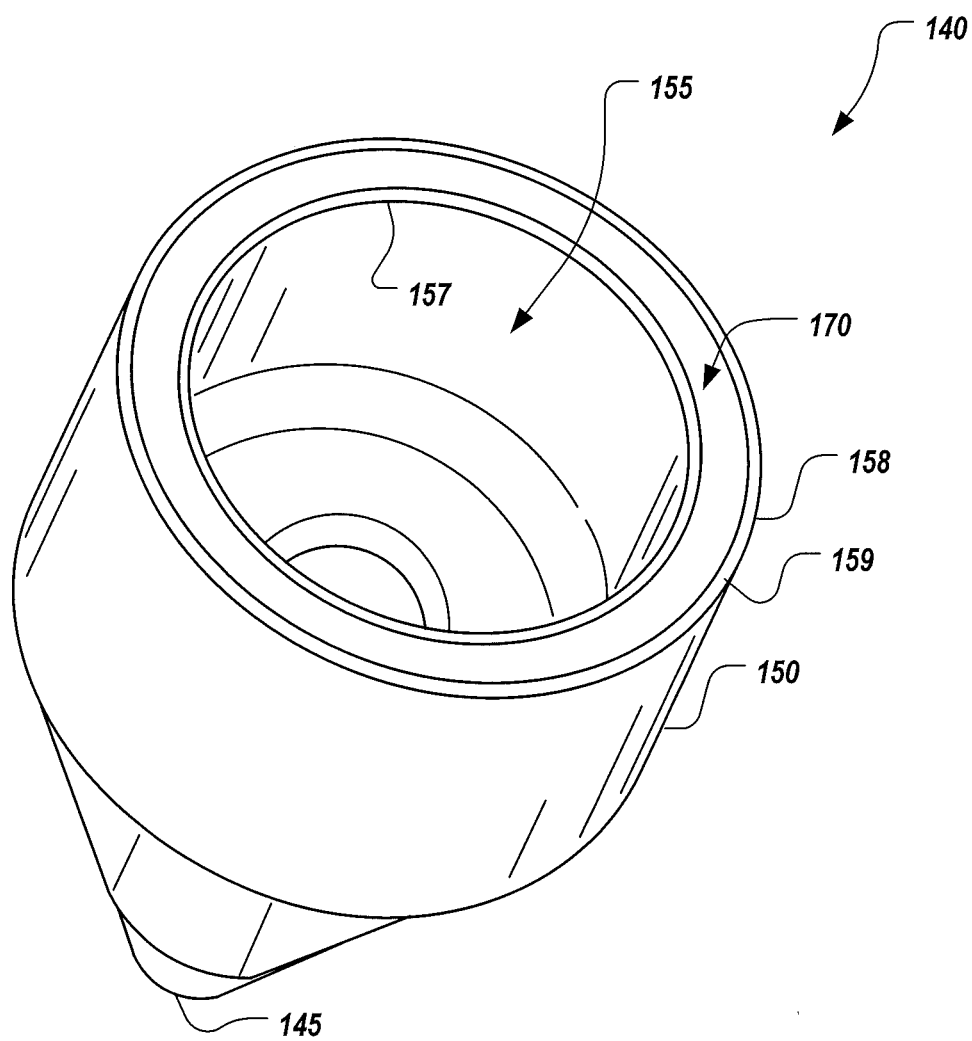
FIGS. 5A-5B show an isolated perspective views of the protective device of FIG. 2 from the bottom.

FIG. 5A shows an isolated perspective view of the protective device 140 from the bottom. The protective device includes a channel 170 that encircles, is around, or surrounds an opening 157 at the base section 156A of the internal cavity 155. An outer surface 158 of the base portion 150 defines an outer circumference 159 of the channel 170. Although the channel 170 shown in FIG. 5A is continuous, in some implementations, the channel 170 may be discontinuous such that the channel is adjacent to only portions of the opening 157 rather than encircling the entire opening 157. The channel 170 may be any suitable shape or size for receiving the interface 165. For example, the channel 170 may be square or rectangular, and the interface may be square or rectangular.

Figure 5B:
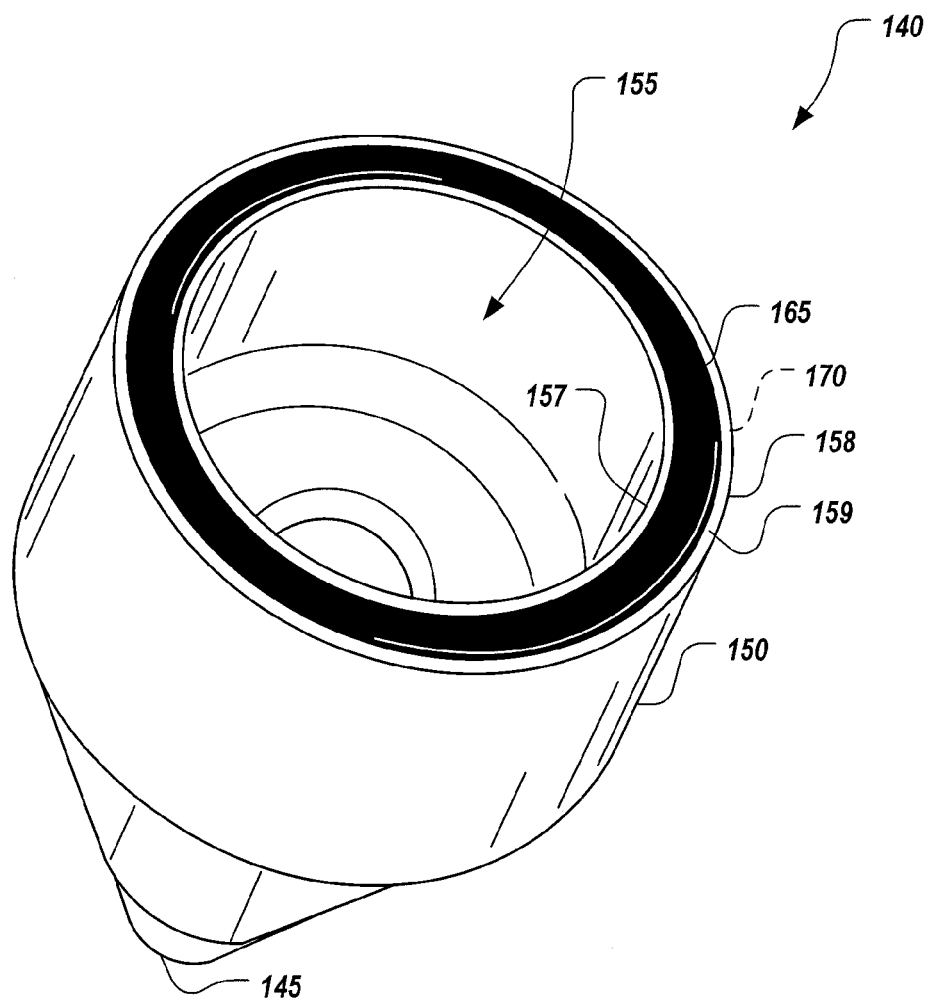

FIG. 5B shows another perspective view of the protective device 140 from the bottom. In the example shown in FIG. 5B, the interface 165 is disposed in the channel 170. The interface 165 may be made from silicone rubber, EPDM, an EPR synthetic rubber, RTV, or any other suitable resilient elastomer. In the example shown in FIG. 5B, the interface 165 is disposed in the channel 170 such that there is little or no air space between the interface 165 and the surfaces of the channel 170. In some implementations, the interface 165 may be loosely disposed in the channel 170 (for example, to accommodate thermal expansion of the interface material). Further, as shown, a single torus interface 165 is used to fill the channel 170; however, any number of appropriate interfaces of various shapes and sizes may be used (for example, interfaces of different materials).

Figure 6:
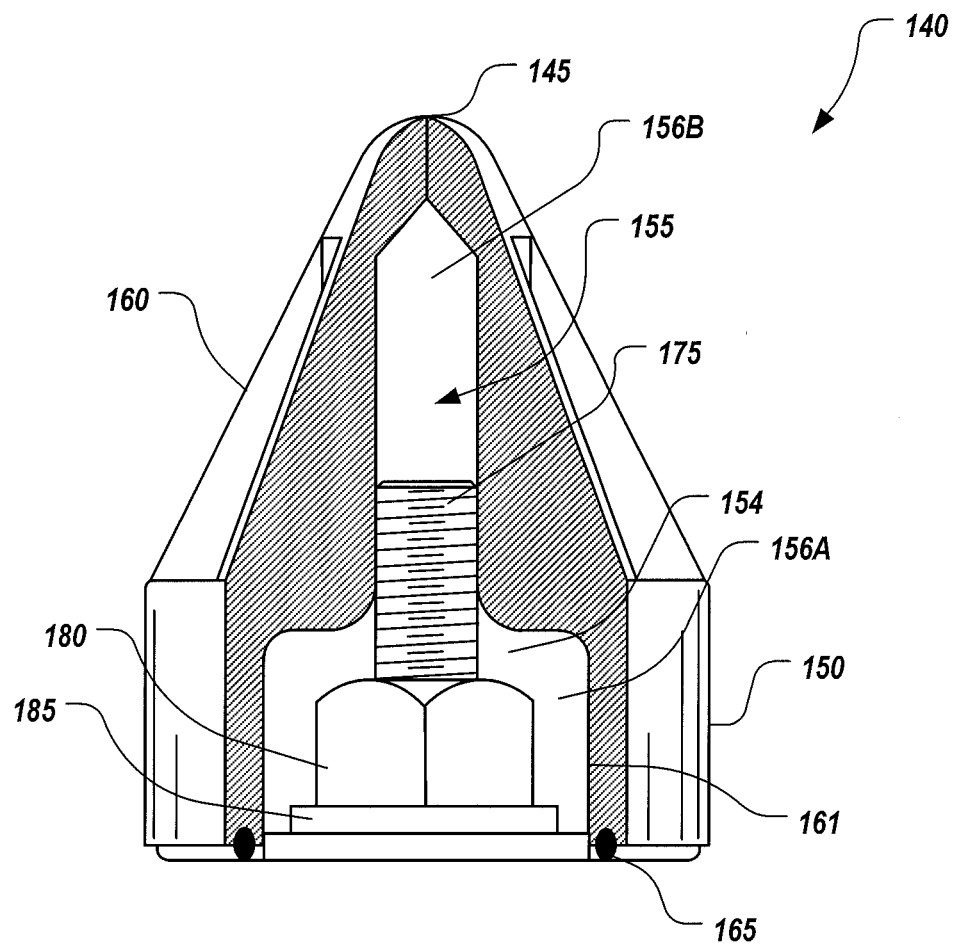
FIG. 6 shows an isolated front, partial cross-section of the protective device of FIG. 2.

FIG. 6 shows an isolated front, partial cross-section of the protective device 140. As discussed above, the internal cavity 155 may be sized and shaped to receive the mounting hardware of any commercially available surge arrester or other electrical device that may be coupled to a support structure and a power system. For example, as shown in FIG. 6, there is a relatively small amount of free space 154 between the edges 161 of the base section 156A of the internal cavity 155 and the mounting nut 180 and washer 185. As such, the internal cavity 155 may receive mounting hardware having a smaller or larger profile than the components depicted. The top section 156B of the internal cavity 155 may receive a longer or shorter mounting bolt 175. For example, the top section 156B and the overall height of the protective device 140 and the cavity 155 may accommodate bolts having a length of about 5.1 cm to 6.4 cm (about 2 to 2.5 inches).

Figure 7:
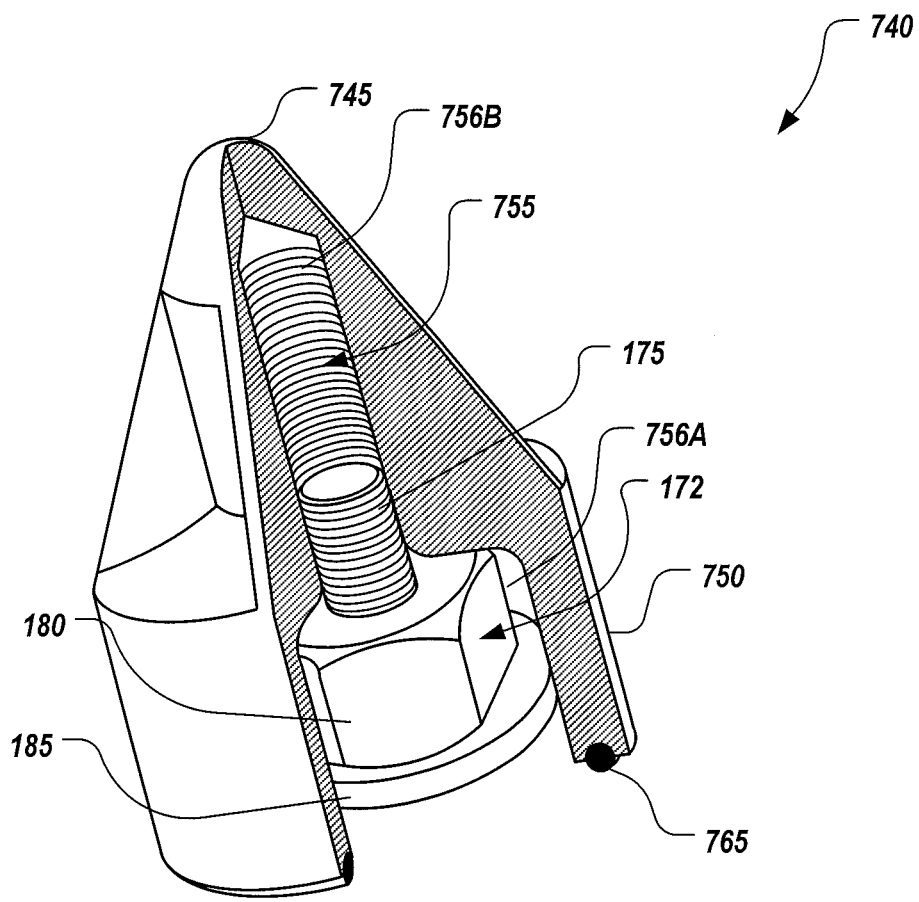
FIG. 7 shows an isolated partial cross-section of another protective device.

FIG. 7 shows an isolated partial cross-section of another example protective device 740. The device 740 includes an interface 765, and the device 740 is positioned over the mount 172. As shown, the protective device 740 includes a top portion 745 and a base portion 750. The inner surface of the protective device 740 defines an internal cavity 755 that receives the mount 172. The base section 756A of the internal cavity 755 is configured to receive the combination of the bolt 175, the nut 180, and the washer 185, and the top section 756B of the internal cavity 755 is configured to receive the shaft of the bolt. In the example shown in FIG. 7, the top section 756B includes a set of interior threads arranged in a pattern that is cooperative with the threaded shaft of the bolt 175. As such, in the example shown, the protective device 740 may be secured to the mount 172 by mating the exterior threads of the bolt 175 with the interior threads of the top cavity section 756B.

Figure 8:
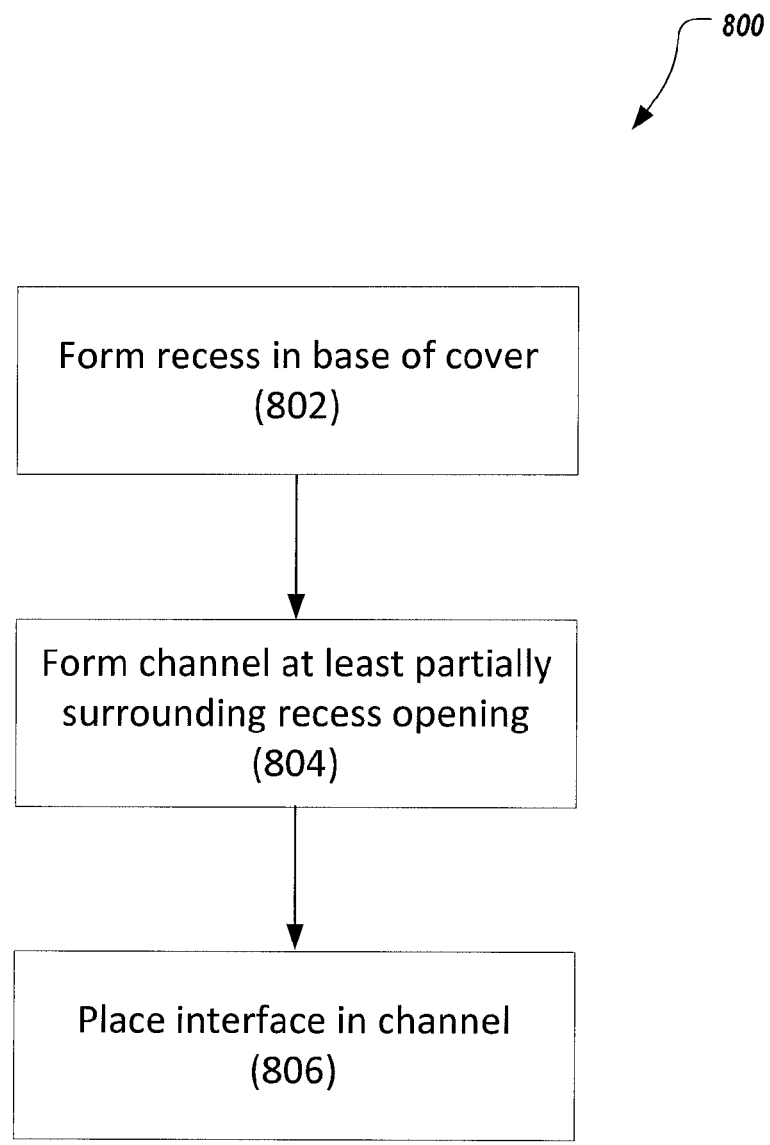
FIG. 8 shows an example process for making a protective device.

FIG. 8 shows an example process 800 for making a protective device. The example process may be used to make a protective device such as the protective device 140 and/or the protective device 740. A recess is formed in the base of a cover (802). The recess may be, for example, the internal cavity 155. The cover may be the protective device 140 (or the protective device 740), the top portion 145 (or the top portion 745), and/or the base portion 150 (or the base section 750).

The recess may be formed simultaneously with, or subsequently to, the other portions of the cover. The recess may be suitably shaped and sized to receive the mounting hardware for a support structure of an electrical device (for example, a surge arrester), such that the cover may be positioned over the mounting hardware. Further, in some examples, the recess may be configured to provide a press fit engagement with the mounting hardware, an interference fit, or to mate with the mounting hardware in any other appropriate mechanical engagement (for example, mating threads), as described above.

A channel, such as the channel 170 of the protective device 140, that at least partially surrounding the recess opening is formed (804) in the cover. The channel may be formed simultaneously with, or subsequently to, the recess. The channel may be formed by removing material from the base to form a recessed region, or the channel may be formed by casting the protective device in a pre-formed mold.

An interface is placed in the channel (806). The interface may be an interface such as the interface 165 (or the interface 765) of the protective device 140 (or the protective device 740). Once placed in the channel, the interface may at least partially surround or encircle an opening (such as the opening 157 of the recess. The interface may be configured to electrically insulate the base of the cover from a support structure (such as the support structure 130 or the second flange area 131B) and/or isolate active grounded terminal of the electric device or the system that includes the electrical device (such as the mount 172).

The interface may be integrally formed with the protective device or provided as a separate, insertable component. For example, the interface may be a pre-formed o-ring gasket or a mold-in gasket. In such examples, the interface may sit in the channel such that a portion of the interface protrudes from the channel. As such, when the interface is brought into contact with a support structure, the interface may compress axially and expand radially to take up air space between the protective device and the support structure. The interface may form a fluid-tight and/or water-tight electric seal between the protective device and a second flange area of the support structure.

Placing the interface in the channel may include pouring (or otherwise placing) a liquefied insulating material in the channel, spreading the liquid throughout at least a portion of the channel, and allowing the liquid to solidify (for example, via insert molding where the protective device is secured in a closed mold cavity and liquefied insulating material is injected into the channel). In some other implementations, placing the interface in the channel may include inserting a pre-formed electrically insulating gasket (such as an O-ring gasket) into the channel and securing the gasket to the channel. For example, the pre-formed gasket may be adhered or mechanically secured to the channel. In other examples, the interface may be loose and separate from the channel, and the interface may be captured between the channel and the support structure when the protective device is placed over the grounded mounting point.

In some examples, the process may further include forming one or more fins (for example, two, three, or four fins), such as the fins 160 of the protective device 140 on an exterior surface of the cover and smoothing (for example, via chemical or mechanical polishing) the fins and all or some of the remaining surfaces cover. The fins may be formed simultaneously with, or subsequently to, the other portions of the cover. The fins may be formed by molding, and the fins may be integral with the protective device such that the protective device is a single piece. In some implementations, the fins may be formed as separate elements and attached to the surface of the protective device after formation of the surface of the protective device.

Figure 9:
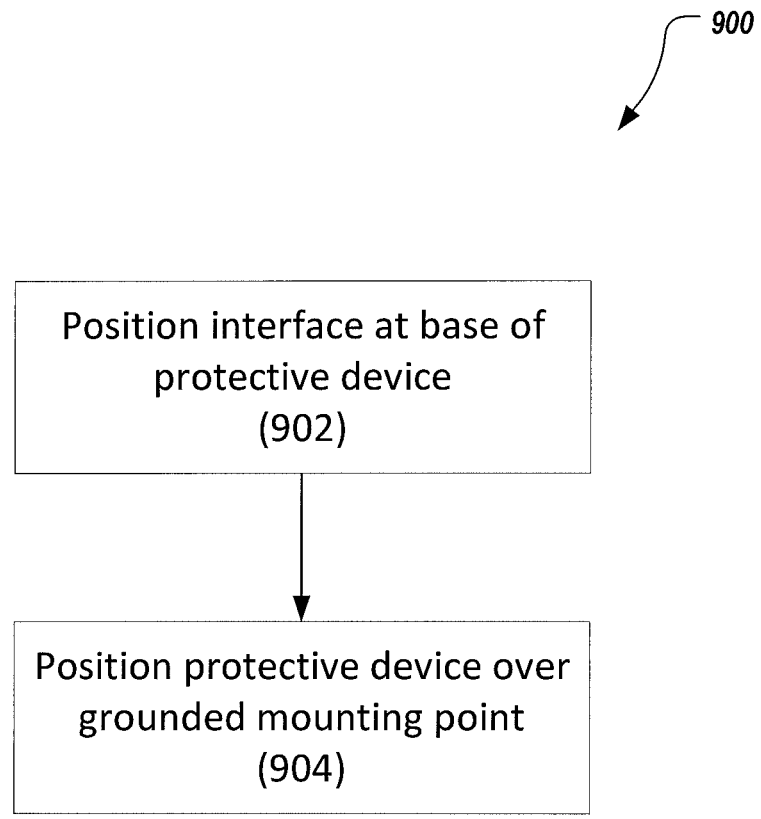
FIG. 9 shows an example process for insulating a grounded mounting point.

FIG. 9 shows an example process 900 for insulating a grounded mounting point. An interface, such as the interface 165, is positioned at a base of a protective device (902). For example, as described above, the interface 165 may be placed in the channel 170 of the protective device 140. In some examples, the interface is loose and separate from the channel 170.

The base of the protective device is placed over the grounded mounting point (904). The base of the protective device is placed over the mounting point such that the mounting point is received by a recess (such as the internal cavity 155) that is open to the base. The interface contacts the support structure to insulate the base of the protective device from the support structure (as well as any electrical equipment coupled thereto). In some examples, placing the base of the protective device over the grounded mounting point includes threading the protective device onto the threads of an external surface of the mounting point. For example, the shaft of a mounting bolt may be threaded into a threaded opening of the recess. The protective device may be placed over the grounded mounting point by a human hand and without the use of tools. Fins (such as the fins 160) of the protective device allow the protective device to be secured to the mount without the use of tools.

In some examples, placing the base of the protective device over the mounting point includes press fitting the protective device onto a portion of the mounting point. The interface may be loose and separate from the protective device. In these implementations, the interface may be placed on the support structure and captured between the protective device and the support structure when the protective device is positioned over the grounded mounting point. Once positioned over the mount, the interior of the protective device may make contact with all of the components of the mount such that there is little to no air in the recess, or the interior of the protective device may make contact with fewer than all of the surfaces of the mount such that there is some air in the internal cavity.

As discussed above, the protective device 140 may increase reliability and safety of the system 10. In some implementations, the protective device 140 may be positioned over the mount 172 and an electrical insulator also may be placed on the energized terminal 105 of the surge arrester. FIGS. 11-14 discuss examples an electrical insulator that may be placed on the energized terminal 105. An electrical insulator of this design is shown, for example, in U.S. Pat. No. 7,301,096, issued on Nov. 27, 2007, which is incorporated herein by reference.

The presence of the electrical insulator discussed in FIGS. 11-14 is not necessary to achieve the safety and reliability benefits provided to the system 10 by the protective device 140 (or the protective device 740). Rather, the electrical insulator discussed below may be used in a system that also includes the protective device 140 (or 740).

Figure 10:
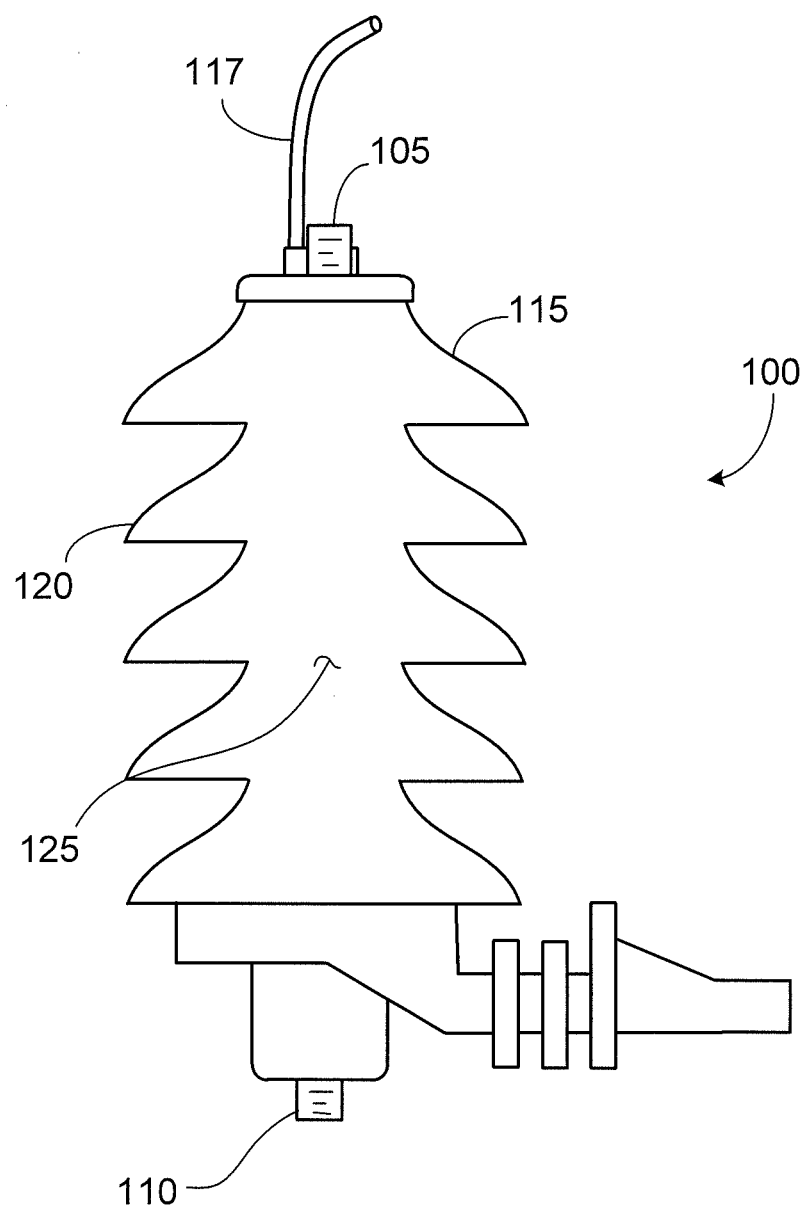
FIG. 10 shows a side view of an example surge arrester.

Referring to FIG. 10, the surge arrester 100 includes the high voltage or energized terminal 105, the ground terminal 110, and an internal electrically-active conductive component such as a bonded-element stack (not shown) that is disposed within the insulating housing 115. At least a portion of the energized terminal 105 is external to the insulating housing 115 such that a portion extends through one end of the insulating housing 115 and connects to a first side of the bonded-element stack, and at least a portion of the ground terminal 110 extends through the opposite end of the insulating housing 115 and connects to a second side of the bonded-element stack. The energized terminal 105 is electrically connected to one or more insulated line leads 117 for connection to other electrical components of the power system. As shown in FIG. 10, the insulating housing 115 includes several weather sheds 120 that extend out from a main body 125 of the insulating housing 115. The insulating housing 115 is typically made of a suitable polymeric material. A surge arrester of this design is shown, for example, in U.S. Pat. No. 6,279,811, issued on Aug. 28, 2001, which is incorporated herein by reference.

Figure 11:
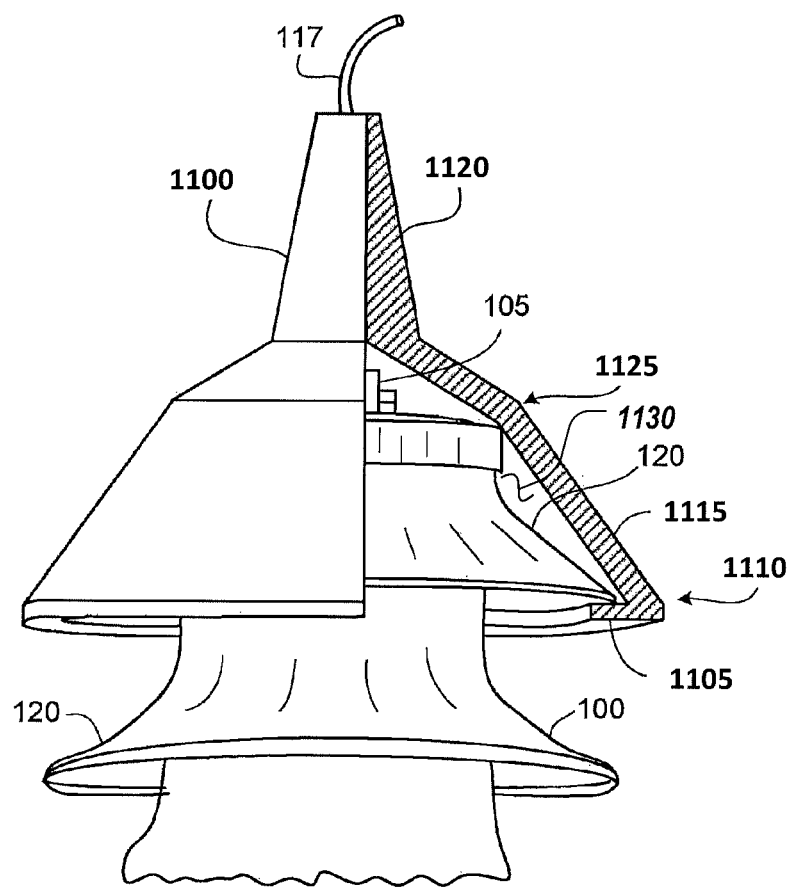
FIG. 11 shows a side view with a partial cross-sectional view of an insulator coupled to the surge arrester of FIG. 10.

Referring to FIG. 11, an electrical insulator 1100 covers the energized terminal 105 of the surge arrester 100. The insulator 1100 provides electrical insulation around energized areas in proximity to the top of the surge arrester 100. The insulator 1100 prevents external objects, such as, for example, animals and tree limbs, from coming into direct contact with or coming too close to energized terminal 105 of the surge arrester 100.

The insulator 1100 is generally shaped like a funnel to fit over the top of the surge arrester 100 and cover the terminal 105 and at least a portion of the first weather shed 120. The insulator 1100 includes a circumferential internal ledge 1105 that extends from a wider end 1110 of a conical wall 1115, and a tube 1120 that extends from a narrow end 1125 of the conical wall 1115. The conical wall 1115 has an opening 1130 that is large enough to receive the first weather shed 120 and the terminal 105 of the surge arrester 100. The tube 1120 has an opening (not shown) that is large enough to receive the one or more insulated line leads 117 that extend from the terminal 105. The ledge 1105 is flexible, extends inward from the wider end 1110, and has an inner diameter that is smaller than an outer diameter of the first weather shed 120. In this way, the ledge 1105 extends below the first weather shed 120 to facilitate locking of the insulator 1100 to the surge arrester 100.

The insulator 1100 is fabricated separately from the surge arrester 100 and then installed by placing the insulator 1100 over the surge arrester 100. The insulator 1100 is pushed onto the surge arrester 100 so that the wider end 1110 expands as the ledge 1105 is moved outward from the first weather shed 120 until the ledge 1105 reaches the edge of the first weather shed 120 and snaps back and extends below the first weather shed 120. The line lead 117 is inserted through the opening of the tube 1120 so that the lead 117 is accessible after the insulator 1100 is installed on the surge arrester 100.

The insulator 1100 is designed with several features that provide suitable and adequate electrical insulation. These features are the selection of material used in making the insulator 1100, the geometry of the insulator, and the fit of the insulator 1100 to the associated surge arrester 100. The insulator 1100 may be made of an elastomeric insulating material, such as, for example, suitable polymers such as vinyl, silicone rubber, EPDM, EVA, or polyethylene. The elastomeric quality of the insulator 1100 facilitates the installation of the insulator 1100 to the surge arrester 100 because the insulator 1100 is elastically deformed during installation. The insulator 1100 has a geometry and a cross-sectional thickness that fully covers at least a top portion of the surge arrester 100, and in particular, the energized terminal 105. The insulator 1100 is designed to withstand power frequency voltages of up to 22 kV rms for 60 seconds while dry. Because the insulator 1100 is designed with the above features, the region of contact between the insulator 1100 and the surge arrester 100 (for example, where the insulator 1100 fits over the first weather shed 120) provides adequate dielectric strength or sufficient physical distance to prevent an electric discharge when a grounded object approaches the terminal 105.

As discussed above, the insulator 1100 may be retrofitted to the surge arrester 100 shown in FIGS. 10 and 11. However, the insulator may be designed to be retrofitted to other types of surge arresters or other types of electrical devices found in power systems. In other implementations, the region of contact between the insulator 1100 and the surge arrester 100 may be facilitated using external adhesives such as, for example, suitable room temperature vulcanized (RTV) silicone rubber, butyl compounds, mastic materials, or other adhesive materials.

Figure 12:
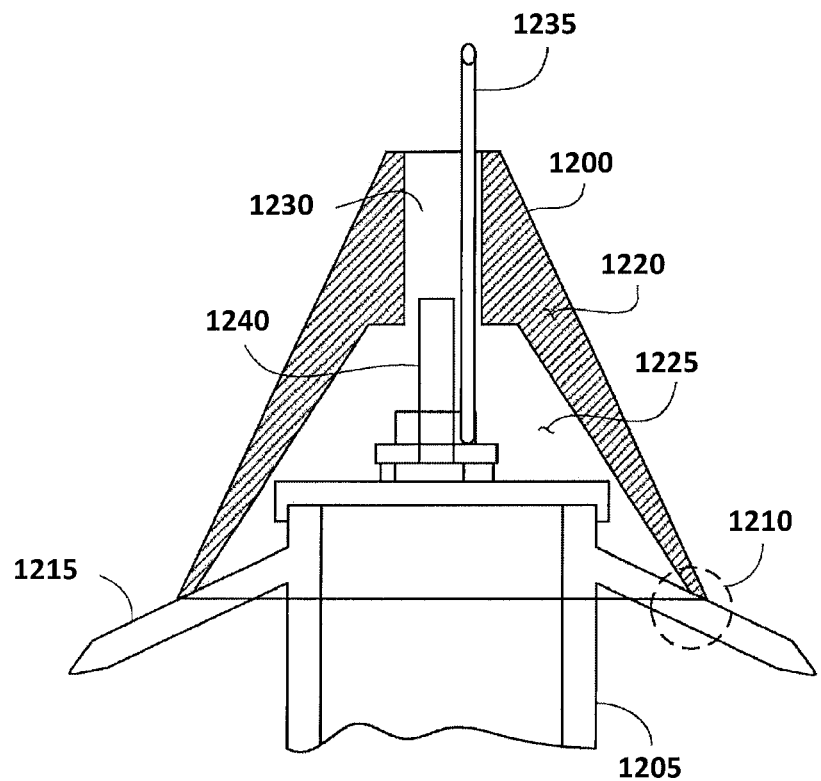
FIG. 12 shows an illustration of another example of an insulator.

For example, FIG. 12 shows another implementation in which an insulator 1200 is provided as part of an as-manufactured surge arrester 1205. The insulator 1200 is made of silicone rubber and the weather shed 1215 is made of silicone rubber. In this design, the region of contact 1210 between the insulator 1200 and the surge arrester 1205 is formed by directly bonding the insulator 1200 to a weather shed 1215 of the surge arrester 1205. The bond is created during manufacture of the insulator 1200 and the surge arrester 1205 by casting, molding, potting, or any suitable bonding technique. Because the insulator 1200 is directly bonded to the weather shed 1215 of the surge arrester 1205, electrical integrity is maintained between the insulator 1200 and the insulating housing of the surge arrester 1205.

Like the insulator 1100 described above, the insulator 1200 is generally shaped like a funnel to fit over the top of the surge arrester 1205 and to cover at least a portion of the first weather shed 1215. The insulator 1200 includes a conical wall 1220 that defines an opening 1225 that is large enough to receive at least a portion of the first weather shed 1215 and an opening 1230 that is large enough to receive one or more insulated line leads 1235 that extend from a terminal 1240 of the surge arrester 1205.

Figure 13:
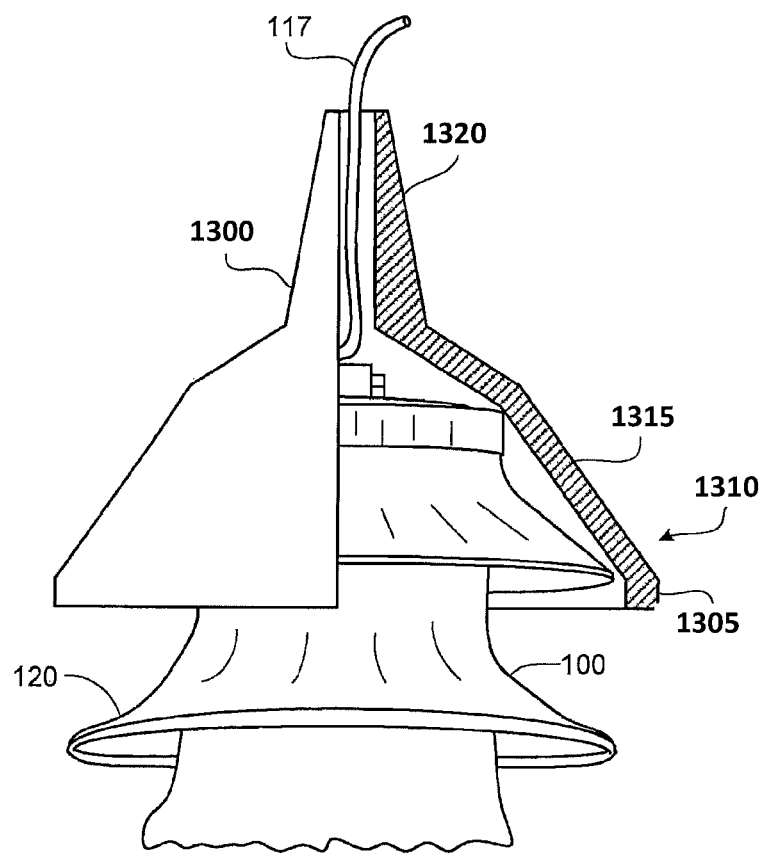
FIG. 13 shows a side view with a partial cross-sectional view of another implementation of an insulator coupled to the surge arrester of FIG. 10.

Referring to FIG. 13, in another implementation, an electrical insulator 1300 covers the energized terminal 105 of the surge arrester 100. The electrical insulator 1300 is designed much like the insulator 1100 described above except that a wider end 1310 of a conical wall 1315 of the insulator 1300 lacks a circumferential internal ledge (such as the ledge 1105). Instead, the insulator 1300 is designed with a circumferential lip 1305 that extends from the conical wall 1315.

The insulator 1300 is suitably locked to the surge arrester 100 by at least the frictional interaction between a tube 1320 and the insulated line leads 117. The insulator 1300 may include ridges or notches along an inner surface of the tube 1320, the conical wall 1315, or the lip 1305 to further facilitate locking of the insulator 1300 to the surge arrester 100.

Figure 14:
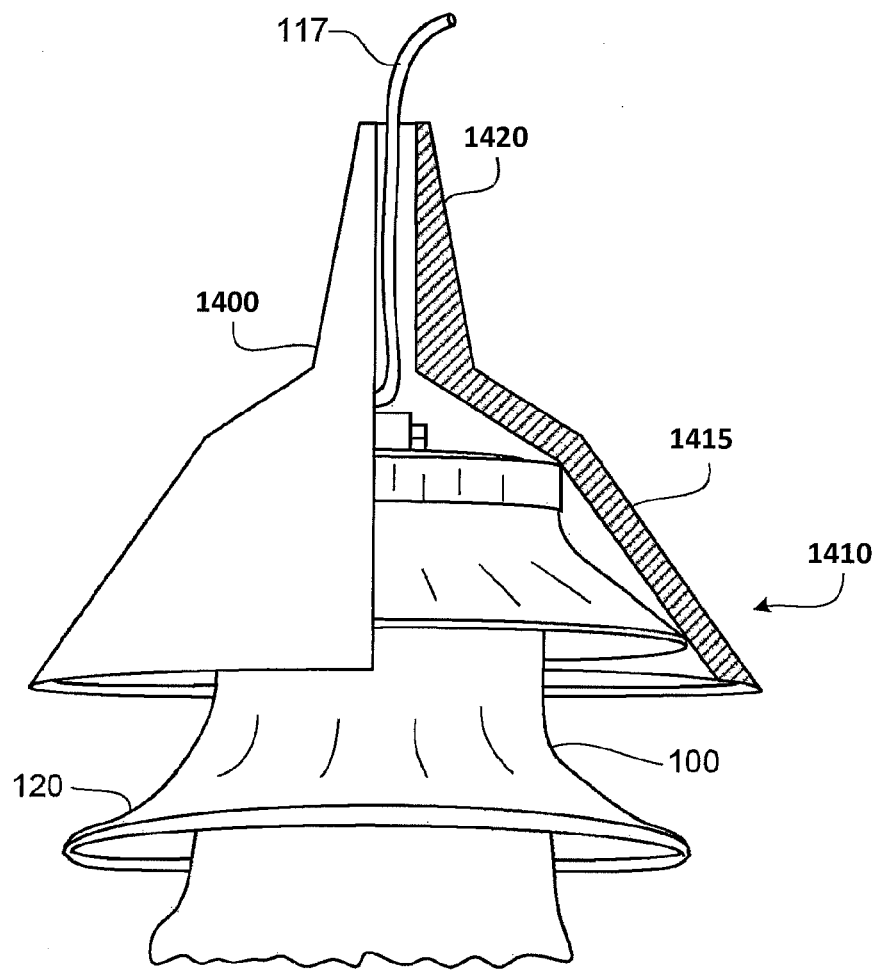
FIG. 14 shows a side view with a partial cross-sectional view of another implementation of an insulator coupled to the surge arrester of FIG. 10.

Referring to FIG. 14, in another implementation, an electrical insulator 1400 covers the energized terminal 105 of the surge arrester 100. The electrical insulator 1400 is designed much like the insulator 1100 described above except that a wider end 1410 of a conical wall 1415 of the insulator 1400 lacks a circumferential internal ledge (such as the ledge 1105). Instead, the insulator 1400 is designed such that the conical wall 1415 extends an additional length to cover the first weather shed 120.

The insulator 1400 is suitably locked to the surge arrester 100 by at least the frictional interaction between a tube 1420 and the insulated line leads 117. The insulator 1400 may include ridges or notches along an inner surface of the tube 1420, or the conical wall 1415 to further facilitate locking of the insulator 1400 to the surge arrester 100.

Other implementations are within the scope of the following claims. For example, the insulator 1200 may be made of vinyl, silicone rubber, EPDM, EVA, polyethylene, or other insulating materials that may be properly bonded to the material of the weather shed 1215. The insulator 1100, 1200, 1300, or 1400 may have a geometry that minimizes the material required, and thereby reduces the cost of the insulator.

The protective device 140 or 740 may be used with any electrical device. For example, instead of or in addition to the surge arrester 100 shown in the system 10 (FIG. 1), the system 10 may include an electrical device such as a fuse, a transformer, a cutout, a switch, other surge arresters installed in currently existing electrical systems, or any component that includes an energized terminal that is configured to be connected to a power system, and a ground terminal that couples to mounting hardware. For example, the protective device 140 or 740 may be mounted to a transformer bushing. The protective device 140 or 740 may be positioned over the mounting hardware of any of these other components. The mount 172 may be energized to a potential that is not ground but that creates a potential difference relative to the energized terminal 105.

The protective device 140 and the protective device 740 may be included as part of an as-manufactured electrical system, a surge arrester, or other electrical device. The protective device 140 and the protective device 740 may be removable from and installable in the electrical system 10 in the field. The protective device 140 may be made without the channel 170. In these implementations, the interface 165 is directly attached to a substantially flat bottom portion of the protective device 140.

Implementation 1 is directed to a device that includes a cover that includes a base, the cover configured to be positioned over a mount that couples a support structure of an electrical device to another element, the electrical device including an energized terminal configured to connect to an electrical power system and a grounded terminal. The device also includes an insulating interface coupled to the base of the cover such that, when the cover is positioned over the mount, the interface contacts the support structure to substantially electrically insulate the mount.

Implementation 2 is directed towards the device of implementation 1, where the cover includes an insulated material configured to withstand a power frequency voltage up to 22 kilovolts (kV) for at least sixty seconds.

Implementation 3 is directed towards the device of implementation 1 or 2, where the interface is integral with the base such that the device is a single piece.

Implementation 4 is directed towards the device of any of implementations 1 to 3, where the interface is a gasket.

Implementation 5 is directed towards the device of any of implementations 1 to 4, where the interface is positioned in a channel formed along an outer circumference of the base of the cover.

Implementation 6 is directed towards the device of any of implementations 1 to 5, where the cover includes an internal cavity and the internal cavity is configured to receive the mount, the internal cavity includes threads on a surface of the cavity, the mount includes threads on an exterior surface, and the threads of the internal cavity are configured to mate with the external threads of the mount to attach the cover to the mount.

Implementation 7 is directed towards the device of any of implementations 1 to 5, where the cover includes an internal cavity and the internal cavity is configured to receive the mount and to attach the cover to the mount with an interference fit.

Implementation 8 is directed towards the device of any of implementations 1 to 7, where an exterior surface of the cover includes smooth surfaces and edges.

Implementation 9 is directed towards the device of any of implementations 1 to 8, where an exterior surface of the cover includes at least one fin that protrudes in a radial direction from the exterior surface of the cover.

Implementation 10 is directed towards the device of any of implementations 1 to 9, where the exterior surface of the cover and the at least one fin include rounded surfaces and edges.

Implementation 11 is directed towards the device of any of implementations 1 to 10, where the device is configured to be positioned over the mount without the use of tools.

Implementation 12 is directed towards the device of any of implementations 1 to 11, where the electrical device includes a surge arrester, the support structure includes an insulating hanger of the surge arrester, and the insulating hanger is mounted to a transformer mounting bracket at the mount.

Implementation 13 is directed towards the device of any of the implementations 1 to 12, where the cover includes an internal cavity and the internal cavity is configured to directly receive the mount such that, when the cover is positioned over the mount and the interface contacts the support structure, the cavity is substantially air-free.

Implementation 14 is directed towards a system including an electrical device including a grounded terminal on a first side and an energized terminal on a second side, the energized terminal being configured to connect with an electrical distribution system, a support structure that holds the electrical device on the first side, a mount configured to couple the structure to another element, the mount being grounded during operation of the system, and a protective device positioned over the mount, the protective device being a device according to any of the implementations 1 to 13.

Implementation 15 is directed towards a system where the electrical device includes a surge arrester.

Implementation 16 is directed towards the system of implementation 14 or 15 and further includes an insulator on the energized terminal of the electrical device.

Implementation 17 is directed towards the system of any of the implementations 14 to 16, wherein the interface comprises a gasket made of an electrically insulating material.

Implementation 18 is directed towards the system of any of implementations 14 to 17, where the interface and the protective device are integral such that the protective device and the interface are a single element.

Implementation 19 is directed towards the system of any of implementations 14 to 18, where the protective device is removable from the mount.

Implementation 20 is directed towards a process including positioning an interface at a base of a protective device, the protective device being a device according to the device of any of the implementations 1 to 13, and placing the base of the protective device over a grounded mounting point that couples a support structure of an electrical device to a mounting bracket, such that, when the grounded mounting point is received in the recess, the interface contacts the support structure to substantially insulate the grounded mounting point and the recess is substantially air-free when the grounded mounting point is received in the recess.

Implementation 21 is directed towards the process of implementation 20, where the interface includes a gasket, and receiving the grounded mounting point in the recess captures the gasket between the base of the protective device and the structure.

Implementation 22 is directed towards the process of implementation 20 or 21, where receiving the grounded mounting point in the recess includes threading the protective device onto threads on an external surface of the mounting point.

What is claimed is:

1. A device comprising:
    a rigid cover comprising a base, the cover configured to be positioned over a mount that couples a support structure of an electrical device to another element, the electrical device comprising an energized terminal configured to connect to an electrical power system and a grounded terminal; and
    an insulating interface comprising a resilient insulating material, the insulating interface coupled to the base of the cover such that, when the cover is positioned over the mount, the interface contacts the support structure to substantially electrically insulate the mount.

2. The device of claim 1, wherein the cover comprises an insulating material configured to withstand a power frequency voltage up to 22 kilovolts (kV) for at least sixty seconds.

3. The device of claim 1, wherein the interface is integral with the base such that the device is a single piece.

4. The device of claim 1, wherein the interface is a gasket.

5. The device of claim 4, wherein the interface is positioned in a channel formed along an outer circumference of the base of the cover.

6. The device of claim 1, wherein:
    the cover comprises an internal cavity and the internal cavity is configured to receive the mount,
    the internal cavity comprises threads on a surface of the cavity,
    the mount comprises threads on an exterior surface, and
    the threads of the internal cavity are configured to mate with the external threads of the mount to attach the cover to the mount.

7. The device of claim 1, wherein the cover comprises an internal cavity and the internal cavity is configured to receive the mount and to attach the cover to the mount with an interference fit.

8. The device of claim 1, wherein an exterior surface of the cover comprises smooth surfaces and edges.

9. The device of claim 1, wherein an exterior surface of the cover comprises at least one fin that protrudes in a radial direction from the exterior surface of the cover.

10. The device of claim 9, wherein the exterior surface of the cover and the at least one fin comprise rounded surfaces and edges.

11. The device of claim 1, wherein the device is configured to be positioned over the mount without the use of tools.

12. The device of claim 1, wherein the electrical device comprises a surge arrester, the support structure comprises an insulating hanger of the surge arrester, and the insulating hanger is mounted to a transformer mounting bracket at the mount.

13. The device of claim 1, wherein the cover comprises an internal cavity and the internal cavity is configured to directly receive the mount such that, when the cover is positioned over the mount and the interface contacts the support structure, the cavity is substantially air-free.

14. A system comprising:
    an electrical device comprising a grounded terminal on a first side and an energized terminal on a second side, the energized terminal being configured to connect with an electrical distribution system;
    a support structure that holds the electrical device on the first side;
    a mount configured to couple the structure to another element, the mount being grounded during operation of the system; and
    a protective device positioned over the mount, the protective device comprising a rigid cover that comprises a base and an insulating interface comprising a resilient insulating material, the insulating interface coupled to the base such that, when the cover is positioned over the mount, the interface contacts the support structure to substantially electrically insulate the mount.

15. The system of claim 14, wherein the electrical device comprises a surge arrester.

16. The system of claim 14, further comprising an insulator on the energized terminal of the electrical device.

17. The system of claim 14, wherein the interface comprises a gasket made of an electrically insulating material.

18. The system of claim 14, wherein the interface and the protective device are integral such that the protective device and the interface are a single element.

19. The system of claim 14, wherein the protective device is removable from the mount.

20. A method of insulating a mounting point of a support structure, the method comprising:

coupling an interface comprising a resilient insulating material to a rigid base of a protective device; and placing the base of the protective device over a grounded mounting point that couples a support structure of an electrical device to a mounting bracket, such that, when the grounded mounting point is received in the recess, the interface contacts the support structure to substantially insulate the grounded mounting point and the recess is substantially air-free when the grounded mounting point is received in the recess.

21. The method of 20, wherein the interface comprises a gasket, and receiving the grounded mounting point in the recess captures the gasket between the base of the protective device and the structure.

22. The method of 20, wherein receiving the grounded mounting point in the recess comprises threading the protective device onto threads on an external surface of the mounting point.

* * * * *